Sept. 12, 1933.  J. F. MURPHY  1,926,696
WORKMAN'S CAGE FOR LADDERS
Filed July 15, 1931  2 Sheets-Sheet 1

INVENTOR
James F. Murphy
BY Samuel H. Davis
ATTORNEY

Sept. 12, 1933.  J. F. MURPHY  1,926,696
WORKMAN'S CAGE FOR LADDERS
Filed July 15, 1931  2 Sheets-Sheet 2
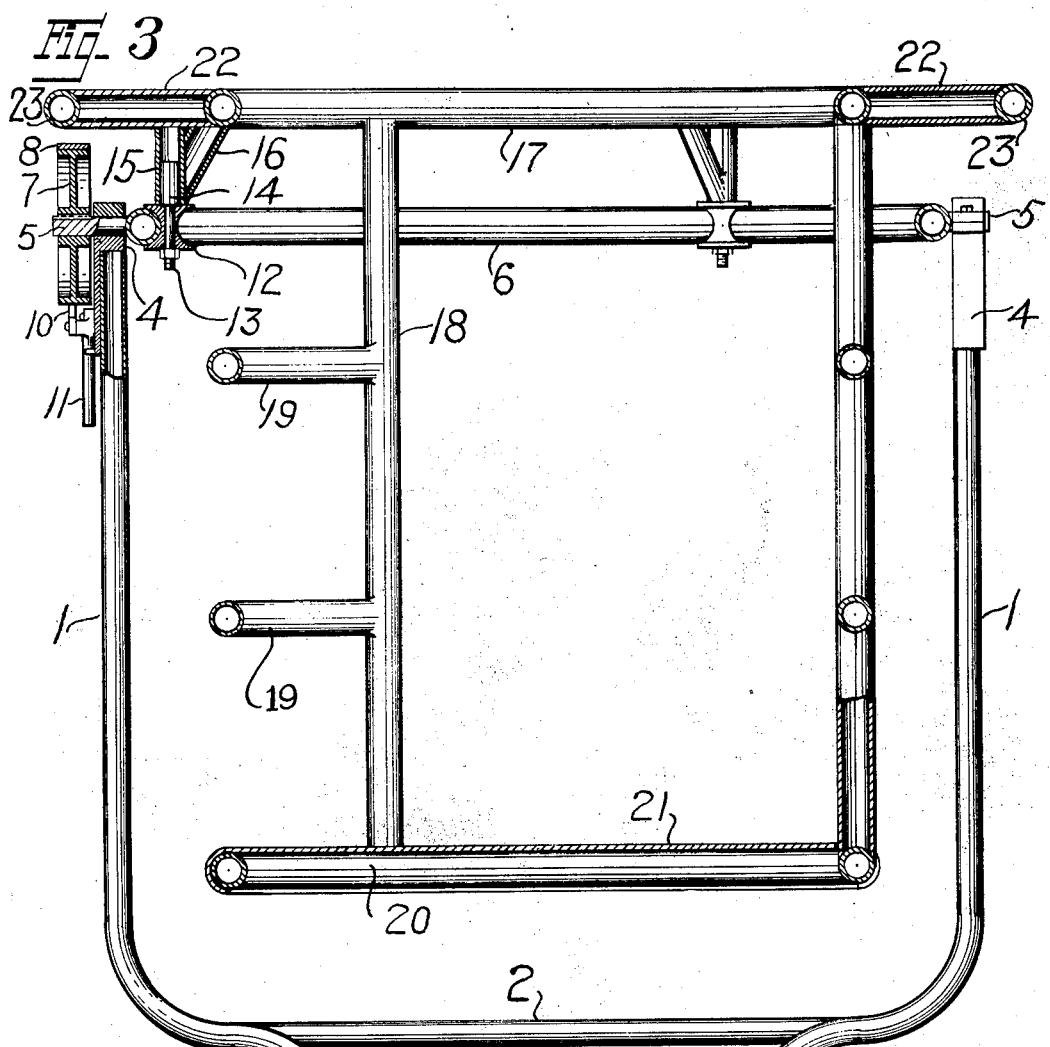
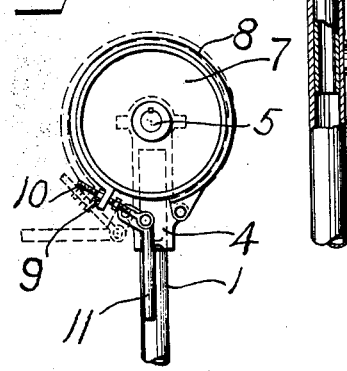
INVENTOR
James F. Murphy
BY
Samuel H. Davis
ATTORNEY Patented Sept. 12, 1933

1,926,696

UNITED STATES PATENT OFFICE 1,926,696

WORKMAN'S CAGE FOR LADDERS

James F. Murphy, Lansing, Mich., assignor of one-half to Joseph W. Gleason, Lansing, Mich.

Application July 15, 1931. Serial No. 551,027

5 Claims. (Cl. 228—60)

This invention relates to workman's cages for ladders, and belongs in the class with safety cages for use on the outer ends of extension ladders or booms. It is especially designed for use by firemen, painters and other workmen who must reach conveniently different heights of a wall or other surface, and different locations at such different heights. The invention comprises preferably a cage made of tubular steel members welded electrically or otherwise one to the other making the whole practically one piece that will be as light as is consistent with safety, and of maximum strength. It is an object of this invention to construct a cage of the nature stated within which a workman may stand and which will be so arranged that the axis of the cage will be vertical at all times regardless of the position of the ladder, and it is provided with means for holding the cage in any of its positions with respect to the sides of the ladder. It is also an object of the special construction embodying this invention to locate at the top a hand rail or upper annular tube or ring somewhat larger in diameter than the cage itself and which upper or outer ring or hoop tube may rest against the side of a building and be moved along the side as the ladder is moved, and thus space the cage somewhat from the wall.

Figure 1:
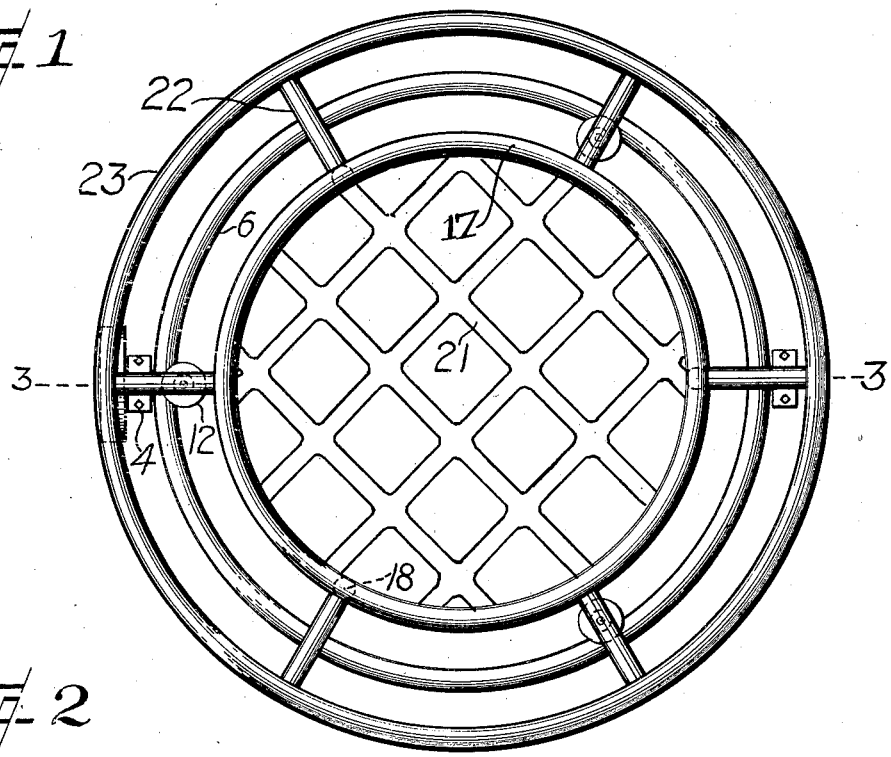
Figure 2:
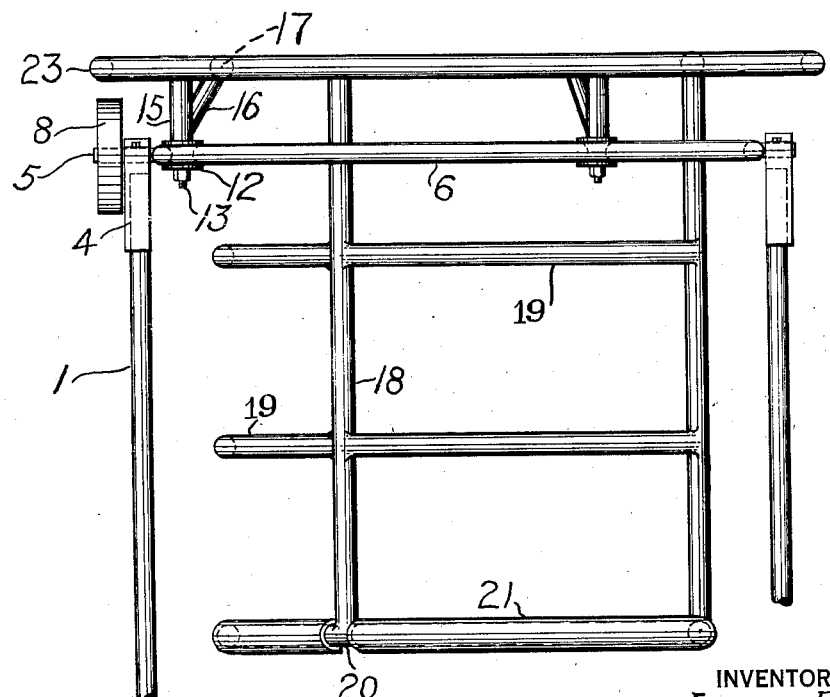

The special construction and combinations of parts comprising this invention are illustrated in the accompanying drawings, of which Fig. 1 represents a top view of all parts assembled. Fig. 2 is a side view. Fig. 3 is a vertical section on broken line 3—3 of Fig. 1. Fig. 4 is a detail top view of the brake wheel or cage lock.

Throughout the drawings and description the same number is used to refer to the same part.

Considering the drawings, there is provided a top fork of strong tubes having the sides 1, 1, with one or more brace tubes 2 suitably located. The lower ends of the sides 1 are turned inwardly as best shown in Fig. 3 and slip into the tubular sides 3 of the ladder having rungs 3a. The upper ends of the sides 1 are provided with attached bearings 4 for trunnions 5 projecting at diametrically opposite points from a carrier ring tube 6. One of the trunnions is secured to a brake wheel or the like 7, having the brake band 8 adjustably connected to screw 10 and adapted to be drawn upon by the hand lever 11. Those brake elements are of the usual construction and operation, and may be replaced by any suitable contrivance selected for the service required. The brake devices are best illustrated in Fig. 4. Nuts 9 adjust band 8 on screw 10.

There may be any number of rollers 12 on vertical axes 13 having cylindrical terminals 14 welded in vertical bracket members 15, which are themselves welded to branch members 16. The rollers engage the tubular carrier ring 6 as shown. The branches 16 are welded at their upper ends to the top tube ring 17 of the cage.

It will be observed in Figs. 2 and 3 that the cage is composed of vertical tubes 18 and horizontal interrupted tubular rings 19, with a ring tube 20 at the bottom carrying any chosen grating or platform 21.

As best illustrated in Fig. 3, it will be noted that the vertical bracket tubes 15 carrying roller axes 13 have their upper ends welded to radial brace tubes 22 from top cage ring 17 welded at their ends to an outermost top or contact ring tube 23. It will be observed also in Fig. 3 that one side of the cage is open by reason of the interruptions in the horizontal ring tubes 19. It is through this opening that a workman may enter the cage from the top rung 3a of the ladder, grasping the top ring 23 with his hands to assist him.

In the operation of this invention, the workman stands upon the platform or grating 21 of the cage, and by means of the hand lever 11 frees the carrier ring 6 which rocks under his weight always into a position with the axis of the cage vertical however the sides 3 of the ladder may incline. When the ladder slants towards a wall, the top or contact ring tube 23 rests against the wall, and the ladder may be moved sidewise moving the tube along the wall, the workman being thus supported in the cage at convenient working distance from the wall. The brake devices are so constructed that by turning the hand lever 11 into the position indicated by the full lines in Fig. 4, the carrier ring will be substantially locked and the cage will not rock. The workman may himself move the top of the ladder sidewise by grasping the outer ring tube 23 at the sides and swinging his body around causing the ring 23 to roll horizontally along the wall for a small distance. The tubular construction is so strong that it will withstand the roughest usage comparatively without disarrangement or breaking.

Having now described the construction of this invention and its use, I claim:—

1. In a cage for ladders, in combination with the sides of a ladder, a ring having trunnions at diametrically opposite points, the ends of the sides of the ladder having bearings for the reception of said trunnions rotatively, means for limiting the rocking movement of the ring upon its trunnions, and a cage carried by the ring and having movable supporting devices engaging the ring whereon the cage may be revolved about a vertical axis in the ring.

2. In a cage for ladders, in combination with the sides of a ladder, a ring having trunnions at diametrically opposite points, the ends of the sides of the ladder having bearings for the reception of said trunnions rotatively, means for limiting the rocking movement of the ring upon its trunnions and for holding the ring at different angles with the ladder, and a cage carried movably on the ring in adjustable relation.

3. In a cage for ladders, in combination with the sides of a ladder, a carrier ring formed of a metal tube and having trunnions at diametrically opposite points, the end of the said ladder having bearings for the said trunnions, means for holding the ring in adjusted positions at an angle with the ladder, and a cage having rollers engaging the said ring to support the cage in revoluble relation.

4. In a cage for ladders, in combination with the sides of a ladder, a carrier ring formed of a metal tube and having trunnions at diametrically opposite points, the ends of the sides of the ladder having bearings for the said trunnions, means for holding the ring in adjusted positions at an angle with the ladder, a cage having at the top a hand rail of greater diameter than the cage, and rollers connected with the said hand rail and engaging the said carrier ring to support the cage in revoluble relation.

5. In a cage for ladders, in combination with the sides of a ladder, a carrier ring formed of a metal tube and having trunnions at diametrically opposite points, the sides of the said ladder having bearings for the said trunnions, means for holding the ring in adjusted positions at an angle with the ladder, a cage formed of metal tubes welded together, the said cage having at the top a hand rail tube of greater diameter than the cage, and rollers connected with said hand rail and engaging the said carrier ring to support the cage in revoluble relation.

JAMES F. MURPHY.